United States Patent
Skulsky et al.

[15] 3,657,962
[45] Apr. 25, 1972

[54] DEVICE FOR REMOVING BURR FORMED DURING RESISTANCE BUTT WELDING OF CASING PIPES

[72] Inventors: Jury Valentinovich Skulsky, bulvar Likhacheva, 3, kv. 71, Kiev; Vasily Grigorievich Boretsky, ulitsa Pushkina, 65, kv. 34, Ivano-Frankovsk; Vasily Alexeevich Sakharnov, bulvar Likhacheva, 3, kv. 64, Kiev; Vladimir Antonovich Kushnir, ulitsa Pushkina, 63, kv. 19; Grigory Grigorievich Semak, ulitsa Karla Marxa, 22, kv. 72, both of Ivano-Frankovsk; Vladimir Ivanovich Tishura, ulitsa Nikolaya Gaitsana, 6, kv. 7, Kiev; Petr Stepanovich Tjupin, ulitsa Karla Marxa, 22, kv. 7; Ivan Vasilievich Diyak, ulitsa Sovetskaya, 97, kv. 5, both of Ivano-Frankovsk; Boris Afanasievich Galian, ulitsa Rozy Ljuxemburg, 15, kv. 9, Kiev; Pavel Ivanovich Schukin, ulitsa Karla Marxa, 22, kv. 50; Ivan Petrovich Danilkiv, ulitsa Galitskaya, 53, kv. 28, both of Ivano-Frankovsk; Vladimer Filippovich Zelensky, ulitsa Bastionnaya, 5, kv. 96, Kiev; Viktor Stepanovich Cherevaty, ulitsa Gagarini, 1, kv. 1, Ivano-Frankovsk; Vladimer Markelovitch Ditchuk, ulitsa Kommuny, 8, kv. 7, Dolina, Ivano-Frankovskoi oblasti; Stanislav Adgamovich Mansurov, ulitsa Gorkogo, 62, kv. 6, Kiev; Vasily Andreevich Sokirko, ulitsa Vatutina, 8, kv. 33, Dolina, Ivano-Frankovskoi oblasti, all of U.S.S.R.

[22] Filed: June 20, 1969
[21] Appl. No.: 835,182

[52] U.S. Cl. ..................................90/24 C, 90/52, 29/481
[51] Int. Cl. ............................................................B23d 3/00
[58] Field of Search ...................90/24, 24.03, 24.05, 24.01, 90/43.52, 49; 83/914, 590; 29/481

[56] References Cited

UNITED STATES PATENTS

| | | |
|---|---|---|
| 3,399,585 | 9/1968 | Ahlert..................................83/914 X |
| 2,806,345 | 9/1957 | Phares.................................83/914 X |
| 2,852,985 | 9/1958 | Schlatter et al..........................90/24 |

Primary Examiner—Gil Weidenfeld
Attorney—Waters, Roditi, Schwartz & Nissen

[57] ABSTRACT

A burr formed between two pipe sections when they are welded together is removed by displacement of a cutting tool inside the welded pipe sections and a second cutting tool outside the welded sections. A burr catcher is coupled to the inner cutting tool to catch the portion of the burr which is removed from the welded joint to enable its subsequent removal. The cutting tool may be free falling or it may be coupled to a free falling weight system, so as to move upwardly in the pipe sections or it may be driven externally by a hydraulic cylinder.

8 Claims, 9 Drawing Figures

DEVICE FOR REMOVING BURR FORMED DURING RESISTANCE BUTT WELDING OF CASING PIPES

The present invention relates to devices for removal of burrs and, more specifically, it concerns devices for removing the burr formed during the process of the resistance butt welding of casing pipes. The invention may be most effectively used in the apparatus for the resistance butt welding of casing pipes when casing wells.

The presently known devices for removing the burr formed in the course of the resistance butt welding of casing pipes are disadvantageous in that they either do not ensure the required quality of dressing the surface of the casing pipes within the welding zone or they are of complex design.

An object of the present invention is to eliminate the above mentioned disadvantages.

The principal object of the invention is to provide a device for removing the burr formed during the resistance butt welding of the casing pipes which would provide for a high-quality surface of the casing pipes within the welding zone and at the same time would not reduce the efficiency of the apparatus for the resistance butt welding of these pipes.

This object is attained by providing a device for removing the burr formed during the resistance butt welding of casing pipes, which device, according to the invention, comprises a movable system with a cutting tool, adapted for contact with the burr at a speed for removing the burr.

The cutting tool is preferably provided with a cutter head complete with a body and form cutters mounted on the body. Each form cutter is provided with a flexible member and with a guide block to adapt the diametrical dimensions of the cutting portion of the tool to any change in the diametrical dimensions of the casing pipes to be welded.

The mass of the movable system may be constituted by the cutting tool.

The movable system may comprise a weight operatively connected with the cutting tool, the mass of said weight exceeding that of the cutting tool.

In addition, the movable system may comprise a pneumatic drive operatively connected with the cutting tool.

The device according to the invention provides for the necessary quality and dimensions of the surfaces of the casing pipes within the welding zone, and this, in turn, provides for an essential reduction in the cost of the well equipment due to simplification in the design of the well (the high-quality removal of the burr makes it possible to use casing pipes of a smaller diameter for casing the well) and a decrease in the weight of the equipment. Furthermore, the high-quality removal of the burr ensures advantageous operating conditions when inserting various mechanisms and instruments into the well and removing them therefrom during the completion and recovery operations.

The invention will be further described by way of example with reference to the accompanying drawings, in which.

Figure 1:
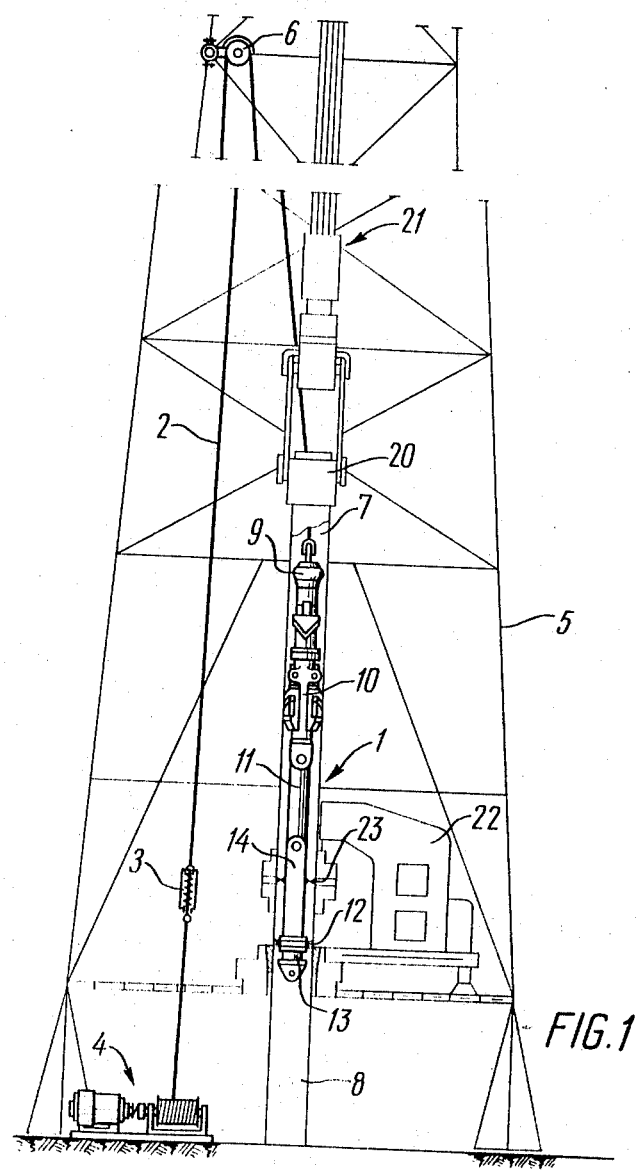
FIG. 1 is a device for removing the inner burr formed during the resistance butt welding of casing pipes, the device, according to the invention, comprises a movable system inclusive of the cutting tool.

The device for removing the inner burr formed during the resistance butt welding comprises a movable system constituted by a cutting tool 1 (FIG. 1), which is connected through a rope 2 and a shock absorber 3 with a winch 4, mounted on the floor of a derrick 5. The rope 2 is run over a guide roller 6 secured to the derrick 5 and is connected to the cutting tool 1 through an electrical insulator 9. The cutting tool 1 comprises a cutter head 10 and a burr catcher suspended from this cutter head by means of an intermediate link 11. The burr catcher has a brush 12 and a permanent magnet 13 mounted on a rod 14 hinge-jointed to the intermediate link 11.

The cutter head 10 has a body 15 (FIG. 2) having form cutters 16 secured to the body 15 at different levels. The number of the form cutters is determined on condition of uniform removal of the burr over the periphery of the casing pipes 7 (FIG. 1) and 8.

Figure 2:
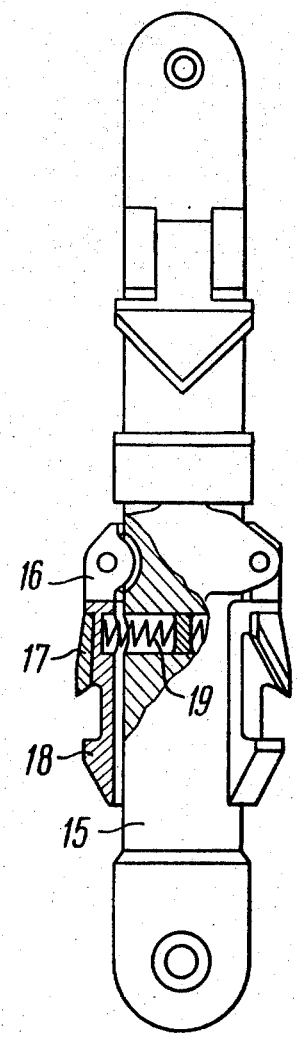
FIG. 2 is the cutter head of the cutting tool or removing the inner burr.

Each form cutter 16 (FIG. 2) is provided with a replaceable cutting member 17 and guide block 18 located ahead of the cutting member 17 at a distance which depends on the overall dimensions of the burr and on the moving speed of the cutting tool 1 (FIG. 1). Each changeable member 17 has a bilateral symmetrical chamfer of the cutting portion for easy cutting into the burr. The form cutters 16 are also provided with resilient members consisting of springs 19 which make it possible to adapt the overall dimensions of the cutting portion of the cutter head 10 (FIG. 1) depending on the overall dimensions of the casing pipes 7 and 8 being welded.

The above-described device operates in the following manner.

Prior to the operation the device is set to the initial position as shown in FIG. 1.

After fixing a sequent casing pipe 7 in the elevator 20, the cutting tool 1 suspended from the rope 2 is inserted into the casing pipe. When lifting this pipe by means of pulley blocks 21, the cutting tool 1 is lowered by gravity within the casing pipe and then, after the centering and clamping of the pipe in the welding apparatus 22, occupies the initial position, in which case the brush 12 and the permanent magnet 13 of the burr catcher are below the welded joint 23 at a distance ensuring thermal protection of the burr catcher during the resistance butt welding. In this case the cutter head 10 is disposed above the joint 23 at a sufficient height such that during its fall and contact with the burr, the burr is removed.

Located at the level of the joint 23 is either the intermediate link 11 or the rod 14 of the burr catcher.

Due to the fact that during the welding operation the joint 23 is always practically disposed at the same height from the floor of the derrick 5, the length of the rope 2 being constant, the distance between the joint 23 and the cutter head 10 in the initial position is also constant and does not depend on the length of the pipe 7 being welded.

During the fusing of the ends of the casing pipes 7 and 8 in the course of the welding the upset metal is partially deposited on the intermediate link 11 and on the rod 14 which are within the welding zone, while the rest of this metal is collected by the burr catcher.

When the welding operation is completed, the drum of the winch 4 is released and the cutting tool 1 falls by gravity. At the moment when the falling cutting tool 1 contacts the burr, it travels at a velocity for the removal of the hot burr. On passing the joint 23, the cutting tool 1 removes the burr around the periphery of the casing pipes 7 and 8.

The efficient removal of the burr in the casing pipes 7 and 8 is obtained by pressing the cutting members 17 of the form cutters 16 against the walls of the above pipes 7 (FIG. 1) and 8 with the aid of the springs 19 (FIG. 2) in the course of movement of the cutting tool 1. The guide blocks 18 (FIG. 2), moving ahead of the cutting members 17, prevent the form cutters 16 from cutting into the wall of the casing pipe 8 (FIG. 1). The removed burr is collected by the burr catcher.

When the burr is removed, the brake (not shown) of the winch 4 is actuated, and the moving cutting tool 1 is stopped by the winch 4 below the joint 23. After removing the burr, the welded casing pipe 7 is inserted into the well, while the cutting tool 1 emerges from the well. The hinge-joint of the intermediate link 11 and rod 14 assists in the free movement of the cutting tool 1 from the casing pipe 7. During the preparation and fixing of a subsequent casing pipe 7 in the elevator 20, the burr catcher is cleaned from the burr.

Thereafter, the operating cycle is repeated.

In the device described hereinabove the cutting tool 1 passes through the joint 23 twice: during the removal of the burr and when lifting this cutting tool together with the burr to the surface in the course of insertion of the casing pipes 7 and 8 into the well. However, the double pass of the cutting tool 1 through the welded joint 23 is eliminated, if in the course of the removal of the burr the cutting tool 1 moves within the casing pipes 7 and 8 upwards, thus removing the burr by a single pass and carrying it to the surface when inserting the welded pipe 8 into the well.

Such an operation is carried out by means of a device for removing the burr formed during the resistance butt welding of casing pipes, which device is provided with a weight 24 (FIG. 3) whose mass exceeds that of the cutting tool 25.

The weight 24 is connected with the cutting tool 25 through rope 2 run over guide roller 6 secured to derrick 5.

The weight 24 is arranged in guides 26 on which is mounted a stop 27 preventing the weight 24 from movement. The rope 2 is connected to the weight 24 through a spring shock absorber 28. In addition, an auxiliary strap 29 is provided which is connected to the weight 24 and used for lifting the weight in the guides 26. The cutting tool 25 is suspended from electrical insulator 9 through the rope 2 and intermediate link 30 hinge-jointed to this insulator 9.

The cutting tool 25 comprises a cutter head 10, a burr catcher secured thereon and provided with a brush 12 and a permanent magnet 13.

The mass of the weight 24 and the height of its fall within the guides 26, located beyond the welded casing pipes 7 and 8, are adopted so as to provide the necessary kinetic energy of the cutting tool 25, when it contacts the burr, to remove this burr. In order to eliminate the stoppage of the cutting tool 25 at the joint 23 after the removal of the burr, the fall height of the weight 24 is increased by the stroke of the spring shock abosorber 28.

The proposed device operates as follows.

Figure 3:
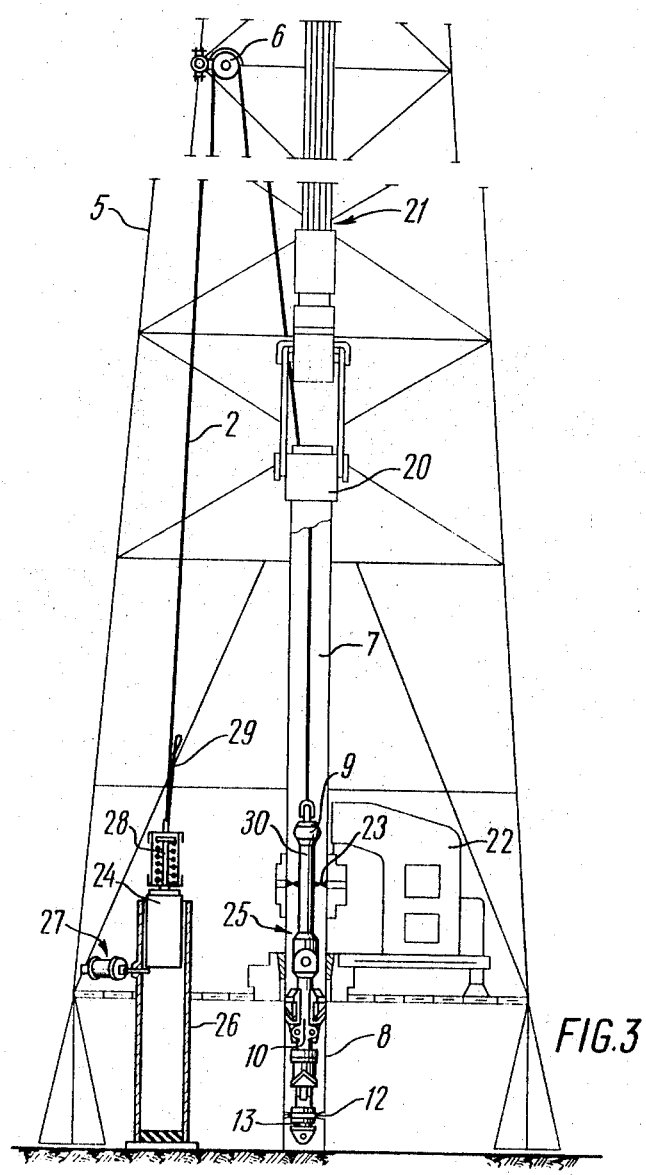
FIG. 3 is a device for removing the inner burr comprising a movable system with a weight whose mass exceeds that of the cutting tool operatively connected thereto.

Prior to the operation the device is set to the initial position. After fixing casing pipe 7 in the elevator 20, the cutting tool 25 suspended from the rope 2 is inserted into this pipe. In the course of lifting the pipe with the aid of the pulley blocks 21, the cutting tool 25 lowers by gravity inside the casing pipe 7. Then, after centering and clamping the casing pipe 7 in the welding apparatus 22, the weight 24 by means of the strap 29 is moved upwards along the guides 26 and is fixed in the upper position with the aid of the stop 27. In this case, the cutting tool 25 occupies the initial position and is located below the welded joint 23 as shown in FIG. 3.

On completing the welding process, the stop 27 is retracted and the weight 24, falling along the guides 26, imparts kinetic energy to the tool 25 for removing the burr.

On passing the joint 23 from the bottom upwards, the cutting tool 25 removes the burr and stops above this joint 23. During the subsequent insertion of the casing pipe 7 into the well, the cutting tool 25 emerges from this pipe. The removed burr is carried away to the surface by the burr catcher. The hinge joint of the intermediate link 30 and cutter head 10 permits the cutting tool 25 to freely move out of the casing pipe 7. Thereafter, the operating cycle of the device is repeated.

When employing the above-described device, any change in the diameter of the casing pipes 7 and 8 to be welded requires the readjustment of the device to change the mass of the weight 24 or the height of its fall.

This readjustment is considerably simplified in the device which employs a movable system comprising a pneumatic drive 31 (FIG. 4) operatively connected with the cutting tool 25. The pneumatic drive 31 consists of a pneumatic cylinder 32 (FIG. 5) whose end cover 33 is provided with an adapter 34 secured thereto. Mounted on the adapter 34 are a stop 35 comprising a turning lever 36 and a pneumatic cylinder 37 for moving this lever. Screwed onto the end of the rod 38 is a back nut 41 coupled with the rope 2 connecting the rod 38 with the cutting tool 25. The air from the pneumatic system (not shown) of the derrick 5 (FIG. 4) is admitted into both chambers A and B of the pneumatic cylinder 32 through pnuematic dischargers 42.

Figure 4:
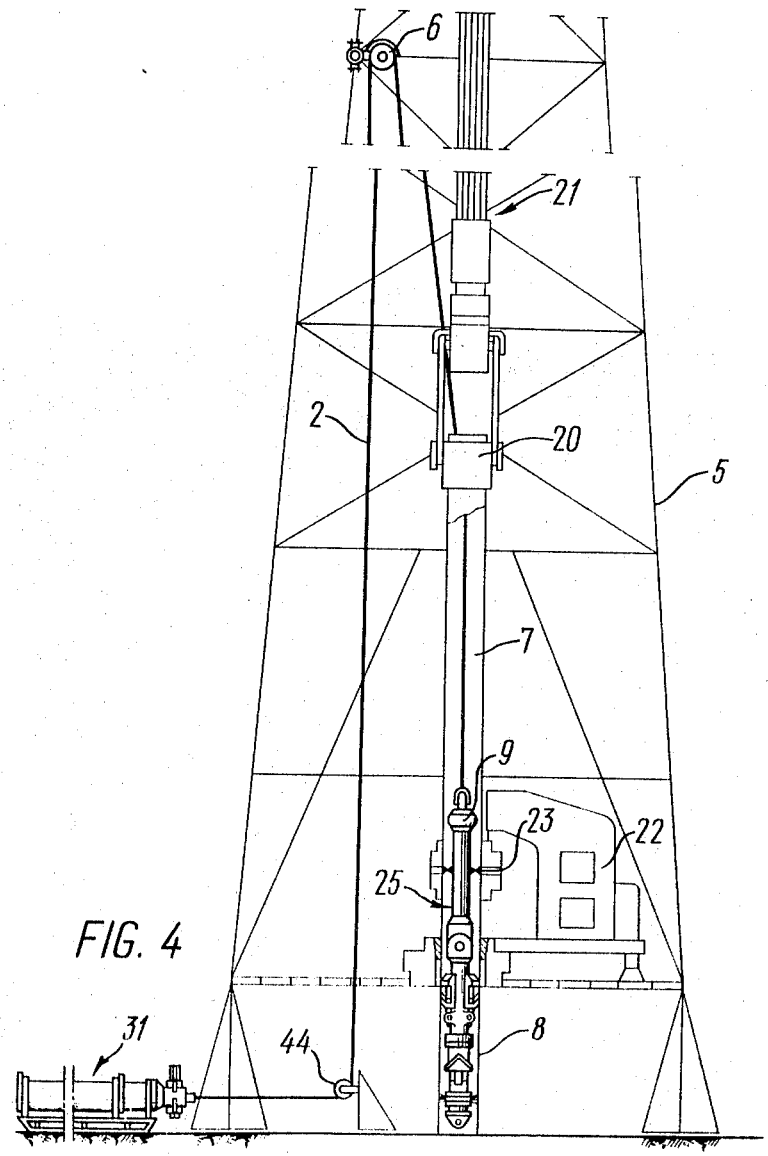
FIG. 4 is a device for removing the inner burr comprising a movable system having a pneumatic drive operatively connected to the cutting tool.
Figure 5:
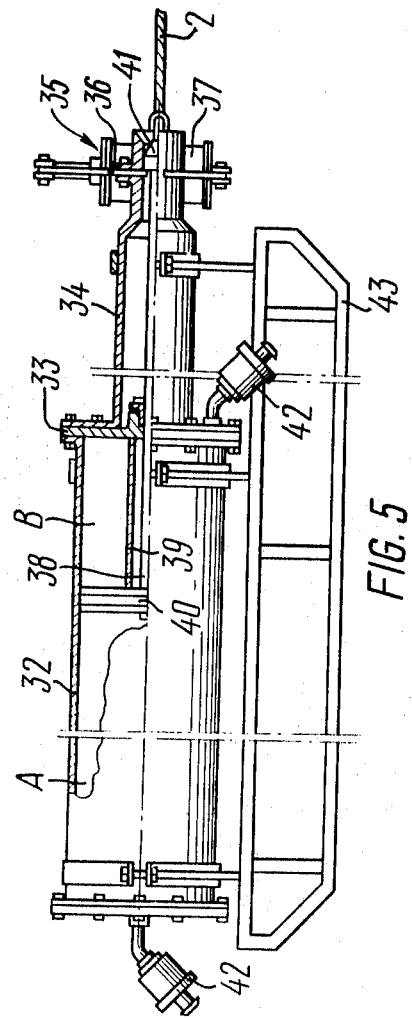
FIG. 5 is a part sectional view of the pneumatic drive for the device for removing the inner burr.

To facilitate the mounting, the pneumatic cylinder 32 (FIG. 5) is installed on the frame 43 mounted on the floor of the derrick 5 (FIG. 4).

A control desk (not shown in the drawing) equipped with a pressure regulator and measuring instruments is employed for controlling the pneumatic drive 31.

The pneumatic drive 31 is mounted on a free site near the derrick 5. The rope 2 connecting the pneumatic drive 31 with the cutter tool 25 passes through the guide rollers 44 and 6, the roller 44 being mounted on the foundation of the derrick 5 and the roller 6 being mounted on the derrick 5 itself.

The described device for removing the burr operates in the following manner.

After completing the preceeding stage of operation, the piston 40 (FIG. 5) of the pneumatic cylinder 32 is at the extreme left-hand position. After fixing a subsequent casing pipe 7 (FIGS. 2 and 4) in the elevator 20, the cutting tool 25 suspended from the rope 2 is introduced into the casing pipe 7. On lifting the casing pipe 7 with the aid of the pulley blocks 21, the cutting tool 25 inserted into the casing pipe 7 moves by gravity downwards. Then, after the centering and clamping of the casing pipe 7 in the welding apparatus 22, the device is set to the initial position, in which the piston 40 (FIG. 5) of the pneumatic cylinder 32 is in the extreme right-hand position, while the cutting tool 25 (FIG. 4) is below the joint 23. In this position, the turning lever 36 (FIG. 5) of the stop 35 engages the back nut 41. The chamber B of the pneumatic cylinder 32 is filled with compressed air, while the chamber A in this case is communicated with the atmosphere through a pneumatic discharger 42.

The distance of the cutting tool 25 (FIG. 4) to the joint 23 is selected so as to prevent the cutting tool 25 from overheating during the process of welding the casing pipes 7 and 8. The length of the stroke of the piston 40 (FIG. 5), in which it moves the acceleration after the operation of the stop 35, is adopted equal to the distance between the cutting tool 25 (FIG. 4) and the joint 23. The total length of the stroke of the piston 40 (FIG. 5) is adopted so as to provide the stoppage of the cutting tool 25 (FIG. 4) after the removal of the burr above the joint 23. The diameter of the pneumatic cylinder 32 (FIG. 5) and the air pressure within the chamber B in the initial position are so adopted that the pneumatic drive 31 (FIG. 4) can impart the necessary kinetic energy to the cutting tool 25 for removing the burr during its travel from the initial position to the joint.

After the completion of the welding process, the turning lever 36 (FIG. 5) disengages the back nut 41, and the piston 40 together with the rod 38 acquires an acceleration which is transmitted through the rope 2 to the cutting tool 25 (FIG. 4). The cutting tool 25 passes through the joint 23, removes the hot burr and stops above this joint. The removed burr is collected by the burr catcher.

When the piston 40 approaches the extreme left-hand position, it is braked by means of a device (not shown in the drawings) throttling the air stream discharged from the chamber A of the pneumatic cylinder 32.

When the welded casing pipe 7 (FIG. 4) is inserted into the well, the cutting tool 25 passes therefrom, while the removed burr is carried to the surface by the burr catcher.

The readjustment of the above-described device for removing the burr formed during the resistance butt welding of the casing pipes 7 and 8 is effected by changing the pressure of the compressed air within the chamber B of the pneumatic cylinder 31.

Figure 6:
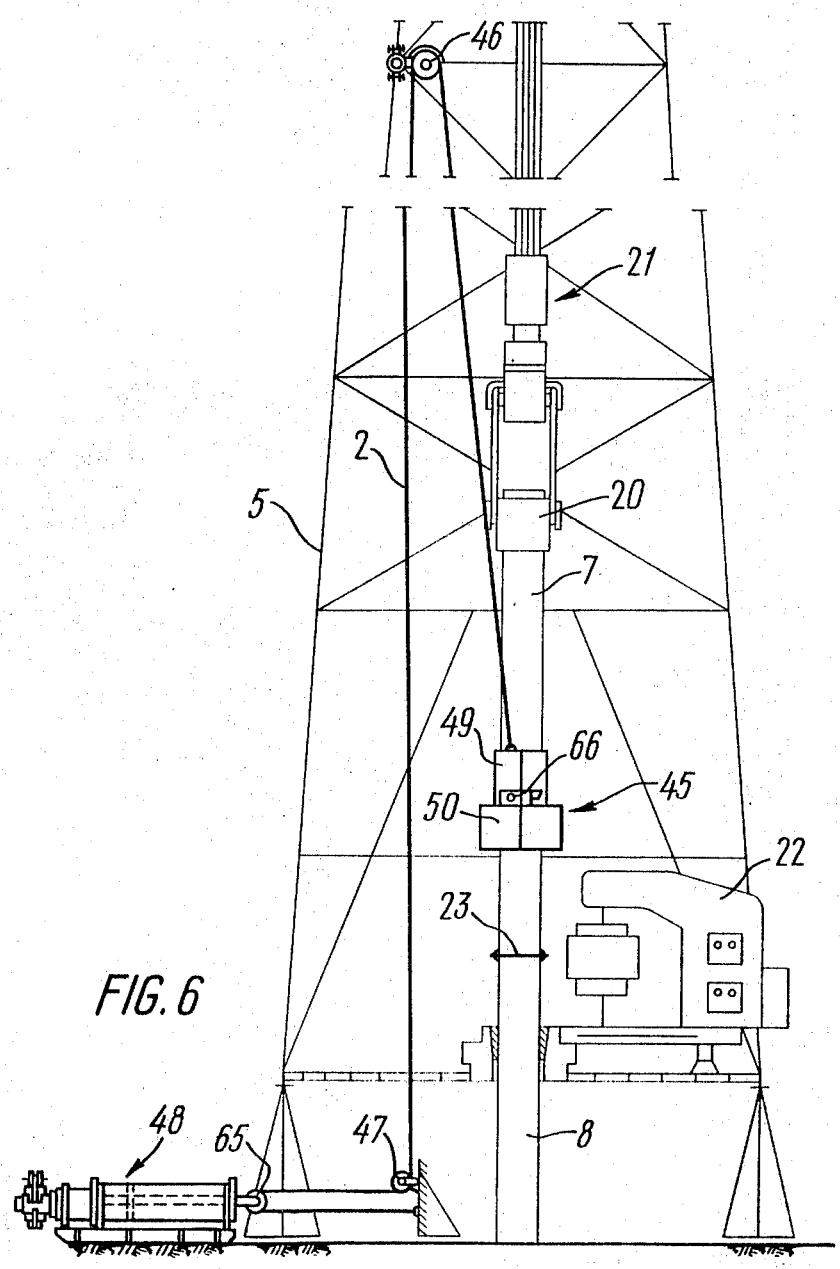
FIG. 6 is a device for removing the outer burr comprising a movable system inclusive of the cutting tool.

The above-described devices are intended for the removal of the inner burr formed during the resistance butt welding of the casing pipes 7 and 8. The device shown in FIG. 6 is designed for the removal of an outer burr formed during the resistance butt welding of the casing pipes 7 and 8. This device comprises a movable system constituted by the cutting tool 45 connected to the pneumatic drive 48 through the rope 2 passed over the guide rollers 46 and 47. The roller 46 is mounted on the derrick 5 at a height exceeding the maximum length of the casing pipe 7 welded to the casing pipe 8, whereas the roller 47 is mounted on the foundation of the derrick 5.

Figure 8:
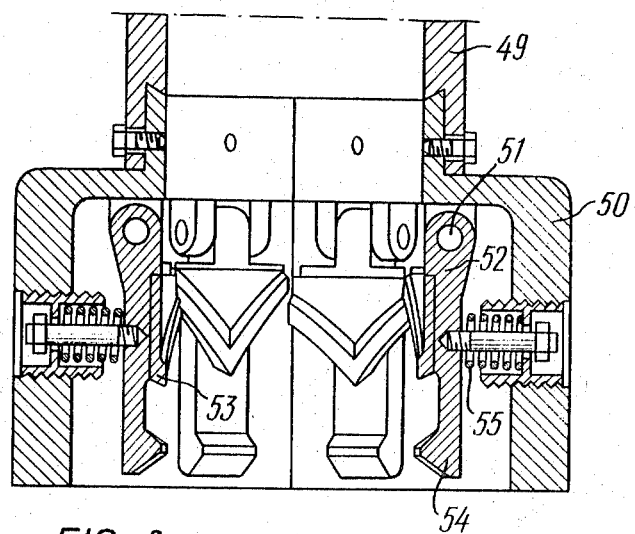
FIG. 8 is a sectional view taken on line VII—VII of FIG. 7 of the cutter head of the cutting tool for removing the outer burr.

The cutting tool 45 comprises a cutter head mounted on a split cylindrical base 49 (FIG. 8) and comprising a split body 50 and form cutters 52 secured on the pins 51 of the body. The number of the form cutters 52 is determined so as to provide for the uniform removal of the outer burr from the surface over the periphery of the joint 23 (FIG. 6). The split body 50 consists of two parts, each being connected with the corresponding part of the split cylindrical base 49.

The form cutters 52 are equipped with replaceable cutting members 53 and with guide followers 54 located ahead of the cutting members 53 at a distance which depends on the overall dimensions of the burr and the moving speed of the cutting tool 45 (FIG. 6). Each cutting member 53 (FIG. 8) is made with a bilateral symmetrical chamfer of the cutting portion, and this ensures favorable conditions for cutting the member into the burr.

Mounted between the body 50 and the form cutters 52 are resilient members, i.e., springs 55 adapted for modification of the diametrical dimensions of the cutting portion of the cutter head depending on the diametrical dimensions of the casing tubes 7 and 8 (FIG. 6) to be welded.

Figure 9:
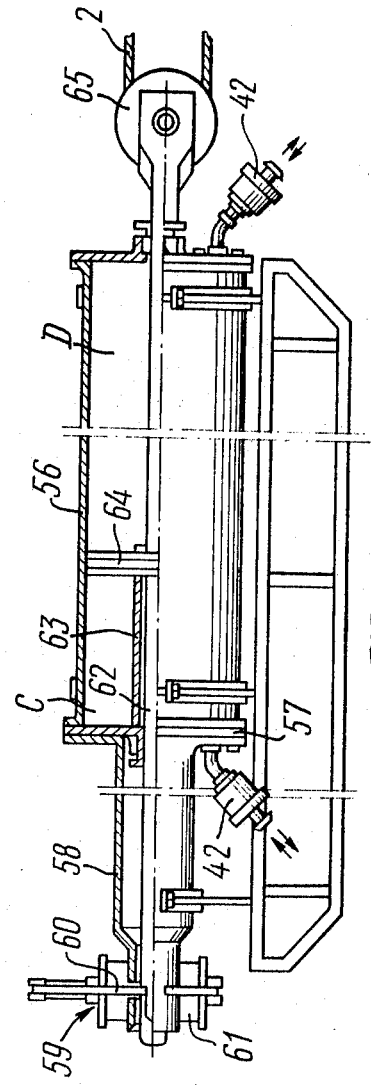
FIG. 9 is a part sectional view of the pneumatic drive of the device for removing the outer burr.

The pneumatic drive 48 of the device for removing the outer burr comprises a pneumatic cylinder 56 (FIG. 9). Mounted on the end cover 57 of the pneumatic cylinder 56 is an adapter 58 carrying a stop 59 with a turning lever 60 and a pneumatic cylinder 61 for moving this lever. Mounted on the rod 62 of the pneumatic cylinder 56 is a bushing 63 limiting the stroke of the piston 64. One end of the turning lever 60 engages the rod 62, the other end of which is equipped with a roller 65.

The dimensions of the pneumatic cylinder 56 and the stroke of the piston 64 are adopted so as to lift the cutting tool 45 (FIG. 6) suspended from the rope 2 above the joint 23 of the casing pipes 7 and 8 to be welded at a height providing for imparting the necessary kinetic energy to the cutting tool 45 during its fall for removing the outer burr.

The device operates as follows.

Figure 7:
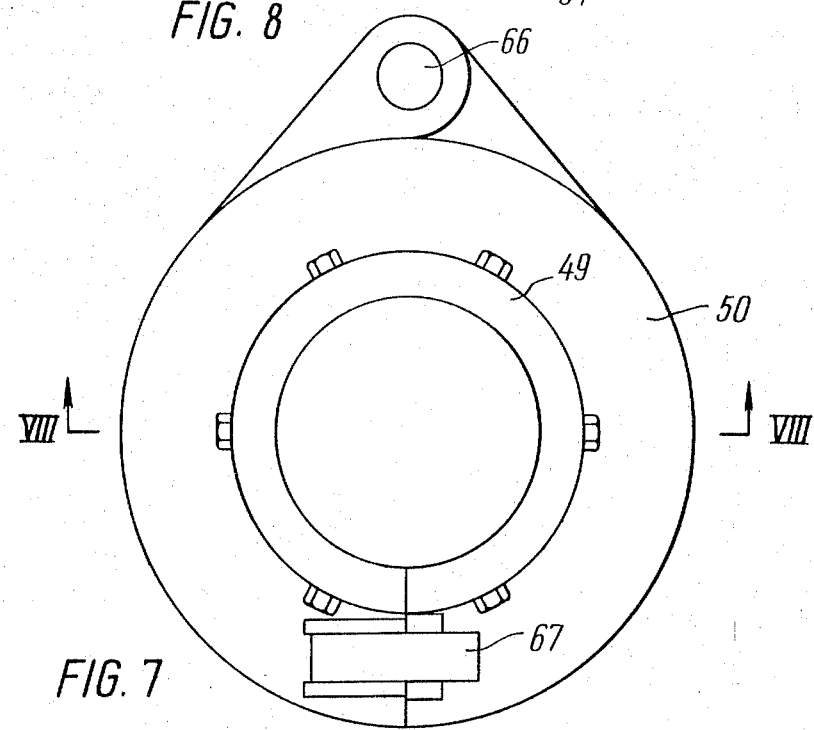
FIG. 7 is a top view of the cutter head of the cutting tool for removing the outer burr.

Prior to the operation, the piston 64 (FIG. 9) is in the extreme right-hand position. After fixing casing pipe 7 in the elevator 20 (FIG. 6) and lifting it up to the vertical position by means of the pulley blocks 21, the cutting tool 45 is put on this pipe 7; the portions of the body 50 are coupled by turning them about an axle 66 (FIG. 7) and by locking them by a lock 67. Then the device is set to the initial position, in which the piston 64 (FIG. 9) occupies the extreme left position, while the cutting tool 45 (FIG. 6) sliding along the casing pipe 7 is disposed at a height for the removal of the outer burr.

The turning lever 60 (FIG. 9) of the stop 59 is engaged with the rod 62, then the casing pipe 7 (FIG. 6) is lifted by the pulley blocks 21 to the initial position for the welding and is centered and clamped within the welding apparatus 22. The chamber C (FIG. 9) is supplied with compressed air, while the chamber D communicates with the atmosphere.

The value of the pressure in the chamber C of the pneumatic cylinder 64 is so adopted that the movement of this piston does not preclude the free fall of the cutting tool 45 (FIG. 6) during the operation of the device.

After the completion of the welding process, the welding apparatus 22 is set to the extreme right-hand position, then the stop 59 (FIG. 9) disengages the rod 60 and the piston 64 moves to the extreme right-hand position under the action of the compressed air in the chamber C, while the cutting tool 45 (FIG. 6) falls by gravity within the casing pipe 7 sliding therealong. After passing the joint 23, the cutting tool 45 removes the burr from this joint. Thereafter, by opening the lock 67, the cutting tool 45 is moved by hand away from the casing pipes 7 and 8. Then the operating cycle is repeated.

The proposed device for the removal of the outer burr operates in conjunction with one of the above-described devices for the removal of the inner burr.

We claim:

1. A device for removing a burr formed during resistance butt welding of two vertically held casing pipes, said device comprising cutting means for removing a burr from the butt weld, means for positioning said cutting means within said pipes, a vertically displaceable mass coupled to said cutting means, means for raising said mass to a height where it possesses potential energy, and means for releasing said mass so that it drops by gravity while conferring kinetic energy to said cutting means such that the cutting means is displaced past said butt weld at a speed to remove said burr.

2. A device as claimed in claim 1, in which the cutting means comprises a cutter head with a body, and form cutters mounted around said body, each of the form cutters including flexible member means and guide block means for adaptation of change in the diametrical dimensions of the cutting tool due to change in the diametrical dimensions of the casing pipes to be welded.

3. A device as claimed in claim 1, in which said mass comprises a weight operatively connected with the cutting means and of a magnitude which exceeds the mass of said cutting means.

4. A device as claimed in claim 1, wherein said means for raising said mass comprises a hydraulic drive means.

5. A device as claimed in claim 1, wherein said cutting means is supported for vertical displacement and said means for raising said mass comprises means for raising the cutting means above the burr and releasing the cutting means for free fall under gravity past said burr.

6. A device as claimed in claim 1, further comprising means coupled to said cutting means for catching the burr removed from said butt weld, and means for relatively displacing the cutting means and the welded casing pipes to expose the burr catching means and the burr caught thereby.

7. A device as claimed in claim 6, wherein the burr catching means comprises a brush and a magnet spaced from one another ahead of said cutting means.

8. A device for removing a burr formed during resistance butt welding of two vertically held casing pipes, said device comprising cutting means for removing a burr from the butt weld, means for positioning said cutting means externally on said pipes, a vertically displaceable mass coupled to said cutting means, means for raising said mass to a height where it possesses potential energy, and means for releasing said mass so that it drops by gravity while conferring kinetic energy to said cutting means such that the cutting means is displaced past said butt weld at a speed to remove said burr.

* * * * *